(12) United States Patent
Nichols

(10) Patent No.: US 6,816,950 B2
(45) Date of Patent: Nov. 9, 2004

(54) METHOD AND APPARATUS FOR UPGRADING DISK DRIVE FIRMWARE IN A RAID STORAGE SYSTEM

(75) Inventor: Charles E. Nichols, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 164 days.

(21) Appl. No.: 10/141,565

(22) Filed: May 8, 2002

(65) Prior Publication Data

US 2003/0212856 A1 Nov. 13, 2003

(51) Int. Cl.[7] ............................................. G06F 12/00
(52) U.S. Cl. ..................... 711/162; 711/114; 707/204; 714/6
(58) Field of Search ................. 711/111–114, 161–162; 714/6; 707/204; 710/1

(56) References Cited

U.S. PATENT DOCUMENTS

| | | | | |
|---|---|---|---|---|
| 5,416,915 A | * | 5/1995 | Mattson et al. | 711/114 |
| 6,067,635 A | * | 5/2000 | DeKoning et al. | 714/6 |
| 6,182,198 B1 | * | 1/2001 | Hubis et al. | 711/162 |
| 6,199,074 B1 | * | 3/2001 | Kern et al. | 707/204 |
| 6,289,397 B1 | * | 9/2001 | Tsuyuguchi et al. | 710/1 |
| 6,526,419 B1 | * | 2/2003 | Burton et al. | 707/204 |
| 6,581,143 B2 | * | 6/2003 | Gagne et al. | 711/162 |

* cited by examiner

Primary Examiner—Nasser Moazzami
(74) Attorney, Agent, or Firm—Duft Setter Ollila & Bornsen LLC

(57) ABSTRACT

The present invention provides systems and methods for logging information regarding write operations directed to the disk being upgraded while the single disk is inoperable during the upgrade process. When the upgrade of the disk is complete, the logged information is used to update the information stored on the upgraded disk. The logged information is sufficient to update the disk contents without requiring a time consuming total reconstruction of the entire content of the disk. In one exemplary preferred embodiment, the logged information identifies a logical block numbers of the disk that are impacted by write operations processed while the disk firmware was being upgraded. Only the data corresponding to the logged logical block numbers needs be reconstructed from the redundant data on other disks of the array. This method of data reconstruction is a less time consuming process than a total reconstruction of all data on the upgraded disk.

20 Claims, 4 Drawing Sheets

METHOD AND APPARATUS FOR UPGRADING DISK DRIVE FIRMWARE IN A RAID STORAGE SYSTEM

BACKGROUND OF THE INVENTION

1. Field of the Invention

The present invention is generally directed toward a method and an apparatus for upgrading a disk in a storage system. More specifically, the present invention is directed to upgrading firmware within a disk of a Redundant Array of Independent Disks (RAID) storage system.

2. Discussion of Related Art

A Redundant Array Of Independent Disks (RAID) storage system typically stores redundant information across multiple disks. The information includes redundant data provided by a host system as well as redundant data generated and managed by the RAID storage system. The generation and management of the redundant information are transparent to the host system. The redundant information is used to enhance the reliability and/or performance of the storage system. For example, when information is lost on one disk of the array, the storage system may continue to operate using the redundant information managed by the storage system on other disks of the array.

An example of a single disk in the array is a hard disk drive as typically found in a personal computer. Access to data on the disks is gained through input/output (I/O) operations, such as reading and writing. Storage controllers that are usually internal to the storage subsystem process these I/O operations. A user working in a host operating system environment of a computer views the multiple disks as a single disk because the redundant information generated and utilized by the RAID storage system and the distribution of information over multiple disks is independent of, and transparent to, the host operating system that is coupled to the RAID storage system.

Since information is redundantly stored, the RAID storage system can operate in a reduced or degraded mode that allows users to continue accessing the information despite a temporary loss of one of the disk drives in the array. The missing information associated with the inoperable disk drive may be constructed from the redundant information stored on the other disk drives of the array. The redundant information stored in other disk drives of the array may also be used to reconstruct the missing information upon reinitialization, repair, or replacement of the lost drive. The RAID storage system structure and operation increases the mean-time-between-failures (MTBF) and makes the RAID storage system more fault tolerant.

The RAID storage system typically includes one or more controllers that provide overall management of the array of disks including communications with attached host operating systems and processing of input/output requests received from the attached host operating systems. These RAID controllers usually include programmable elements, such as processors, that are programmed with instructions, such as software or firmware. The programmed instructions operate the programmable elements of the RAID controllers. In a similar manner, the individual disks of the array often include lower level programmable controller elements for operational control of one corresponding disk.

Occasionally, disk manufacturers develop improvements, or upgrades, to the disks of the RAID storage system. The improvements, or upgrades, often include changes to the programmed instructions that are operable within a microcontroller or processor that controls an individual disk. The improvements can also include downgrades when problems are detected with recently installed firmware. As used herein, "upgrade" refers to any modification of the firmware of the disk drive whether the modification is strictly speaking an upgrade of features or a downgrade to restore a previous version of firmware. A firmware upgrade installation to the disk involves removing the disk from operation of the RAID storage system. One approach to installing the firmware of the disks includes removing the entire RAID storage system from operation while each disk in the RAID storage system has new firmware installed. This process can be time consuming since a RAID storage system typically includes many disks from the same manufacturer. Upon completion of a firmware installation, the RAID storage system is again made operable. An inoperable RAID storage system is unacceptable in many business environments that demand high reliability and availability of the storage system. For example, a security system using a RAID storage system that becomes unavailable during a period of upgrading would be unacceptable since security breaches may occur during such a "down" time.

Another method of upgrading firmware of the disks of an array includes disabling one disk at a time, thereby placing the RAID storage system in a degraded mode rather than a totally inoperable mode. The RAID storage system can remain in operation while the disk is upgraded with new firmware instructions. Once the firmware upgrade for one disk is complete, present methods reconstruct all data on the disk from redundant data on other disks in the RAID storage system. However, this process of reconstruction for even a single disk drive is time consuming, especially on modern, high-density, large capacity disks. Furthermore, the RAID storage system must continue to operate in a degraded mode until the data is reconstructed further complicating the reconstruction process.

As evident from the above discussion, a need exists for improved structures and methods for modifying the firmware in disk drives of a RAID storage system so as to reduce "down" time.

SUMMARY OF THE INVENTION

The present invention solves the above and other problems and advances the state of the useful arts by providing an apparatus and a method for upgrading firmware on a disk of the array without a need for total reconstruction of the data on an upgraded disk. More specifically, the present invention provides for logging information regarding write operations directed to the disk being upgraded while the single disk is inoperable during the upgrade process. When the upgrade of the disk is complete, the logged information is used to update the information stored on the upgraded disk. The logged information is sufficient to update the disk contents without requiring a time consuming total reconstruction of the entire content of the disk. In one exemplary preferred embodiment, the logged information identifies a logical block numbers of the disk that are impacted by write operations processed while the disk firmware was being upgraded. Only the data corresponding to the logged logical block numbers need be reconstructed from the redundant data on other disks of the array. This method of data reconstruction is a less time consuming process than a total reconstruction of all data on the upgraded disk.

In a second exemplary preferred embodiment, the logged information includes details of the write operations processed while the disk firmware was being upgraded. The write operations impact the stored content of the upgraded disk. The details of the write operations are preferably sufficient to permit the RAID storage controller to re-process the request to the extent it impacts the stored data on the upgraded disk. This second exemplary embodiment may require additional storage as compared to the first exemplary embodiment because the data to be written is stored with the logged write operations. However, this second exemplary embodiment may be faster as compared to the first exemplary embodiment because it need not access redundant information on other disks of the array to update the data stored on the upgraded disk. The updated data is simply written to the upgraded disk rather than reconstructed from redundant data stored on other disks of the array.

In an exemplary preferred embodiment of the invention, a method and a system for programming firmware instructions into a disk-drive controller of a first disk within a plurality of disks is provided. A system includes a data router for routing update requests of the first disk. The system also includes a storage component communicatively connected to the data router for logging the update requests in a unit log. The system also includes a data updater communicatively connected to the storage component for updating data within a portion of the first disk based on the logged update requests of the unit log. The system also includes a programming module communicatively connected to the disk-drive controller of the first disk for modifying the firmware instructions while remaining disks of the plurality of disks continue to operate.

One aspect of the invention provides a method of upgrading firmware in a unit of a redundancy group in a Redundant Array of Independent Disks, the method including steps of: disabling the unit; modifying the firmware of a controller of the disabled unit in response to disabling the unit; logging update requests directed to the disabled unit in a unit log during the step of modifying; and updating data within a portion of the disabled unit based on the logged update requests of the unit log in response to a completion of the step of modifying, such that the disabled unit includes a number of disks that is less than all of the redundancy group.

Another aspect of the invention further provides that the step of modifying includes a step of programming firmware instructions in the controller of the disabled unit.

Another aspect of the invention further provides for a step of enabling the disabled unit in response to a completion of the step of updating.

Another aspect of the invention further provides that the step of logging update requests includes a step of logging write requests to the unit log for updating information stored on the disabled unit such that the logged write requests include data to be written to the disabled unit.

Another aspect of the invention further provides that the step of updating includes a step of processing the logged write requests for updating information stored on the disabled unit.

Another aspect of the invention further provides that the step of logging includes a step of logging logical block numbers for blocks on the disabled unit affected by the update requests processed during the step of modifying.

Another aspect of the invention further provides that the step of updating includes a step of reconstructing the data within the portion of the disabled unit in response to the completion of the step of modifying based on logged update requests.

Advantages of the invention include decreasing an amount of time required to reconstruct data on a disk in a Redundant Array of Independent Disks (RAID) storage system due to software installations to the disk. Other advantages include removing a need for data reconstruction by logging updates, or write requests, to data on the disk such that the data is updated with respect to the write requests.

BRIEF DESCRIPTION OF THE PREFERRED EMBODIMENTS

DETAILED DESCRIPTION OF THE PREFERRED EMBODIMENTS

Figure 1:
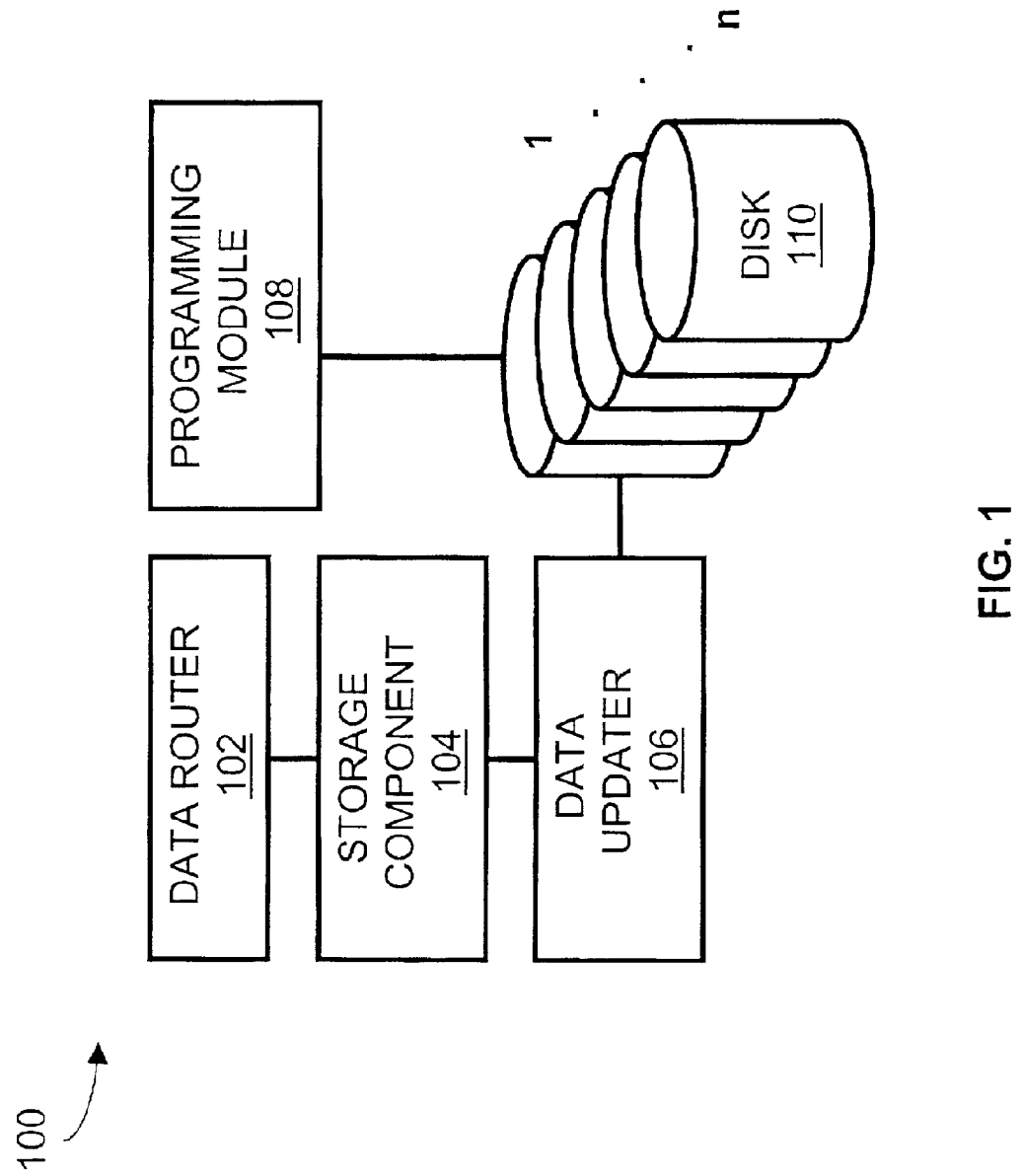
FIG. 1 is a block diagram illustrating an exemplary preferred embodiment of the invention.

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

With reference now to the figures and in particular with reference to FIG. 1, an exemplary preferred embodiment of the invention is shown in system 100. System 100 is configured to program firmware instructions into a disk-drive controller of a unit. The unit may include a single disk of a plurality disks 110. An example of a plurality of disks 110 may include a Redundant Array of Independent Disks (RAID) storage system. System 100 includes data router 102, storage component 104, data updater 106, and programming module 108. Data router 102 is communicatively connected to storage component 104. Data router 102 may be configured for routing update requests of each of a plurality of disks 110. An update request can include an input/output operation such as reading and writing.

Storage component 104 is communicatively connected to data router 106. Storage component 104 may be configured for logging the update requests. Storage component 104 can include a unit log for logging the update requests. The update requests may include write requests received from data router 102. The write requests may be logged in the unit log.

Data updater 106 is communicatively connected to storage component 104. Data updater 106 may update data within a portion of a disk within a plurality of disks 110 based on update requests that are logged in storage component 104. Data updater 106 may be configured to reconstruct data from a portion of the disk within a plurality of disks 110 based on update requests that are logged in storage component 104. The portion of the disk may be an amount of storage space that is less than a total amount of storage space on the disk. However, the portion may include an amount of storage space that is greater than the amount of storage space on the disk. An example of a portion that is greater that an amount of storage space on the disk would include more than one disk of the plurality of disks. The portion, however, includes an amount of storage space that is typically less than a total amount of storage space of the entire plurality of disks.

Programming module 108 is communicatively connected to a disk drive controller of the plurality of disks 110. Programming module 108 is configured to install the firmware instructions on one of the disks of the plurality of disks 110 while remaining disks of the plurality of disks continue to operate.

Figure 2:
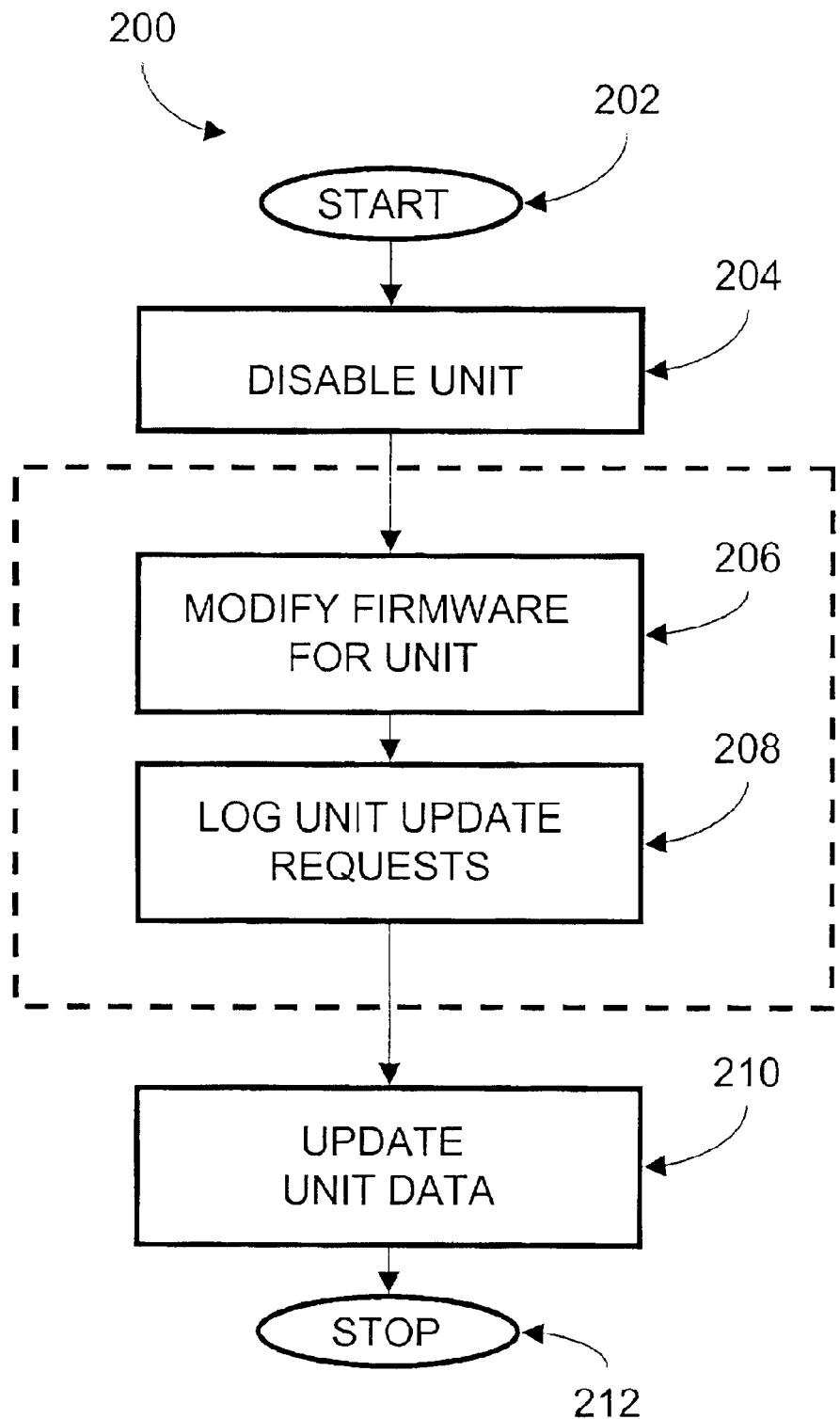
FIG. 2 is a flow chart diagram illustrating an exemplary preferred operation of the invention.

FIG. 2 illustrates exemplary preferred operation 200 of system 100 of FIG. 1. Operation 200 commences in step 202. A unit is disabled so that firmware for the unit can be modified in step 204. Disabling may include disabling the update requests to the unit. The firmware of the unit is modified in step 206. After the unit is disabled and while the firmware is being modified, the update requests that are directed to the unit are logged in a unit log of storage component 104 of FIG. 1 in step 208. The dashed line around steps 206 and 208 indicate that these operations are performed substantially in parallel. In other words, information reflective of updates to the disabled unit is logged (step 208) while the firmware of the unit is being updated (step 206). Once the firmware is modified, data within the unit is updated based on the logged update requests within the unit log in step 210. Operation 200 ends in step 212.

Figure 3:
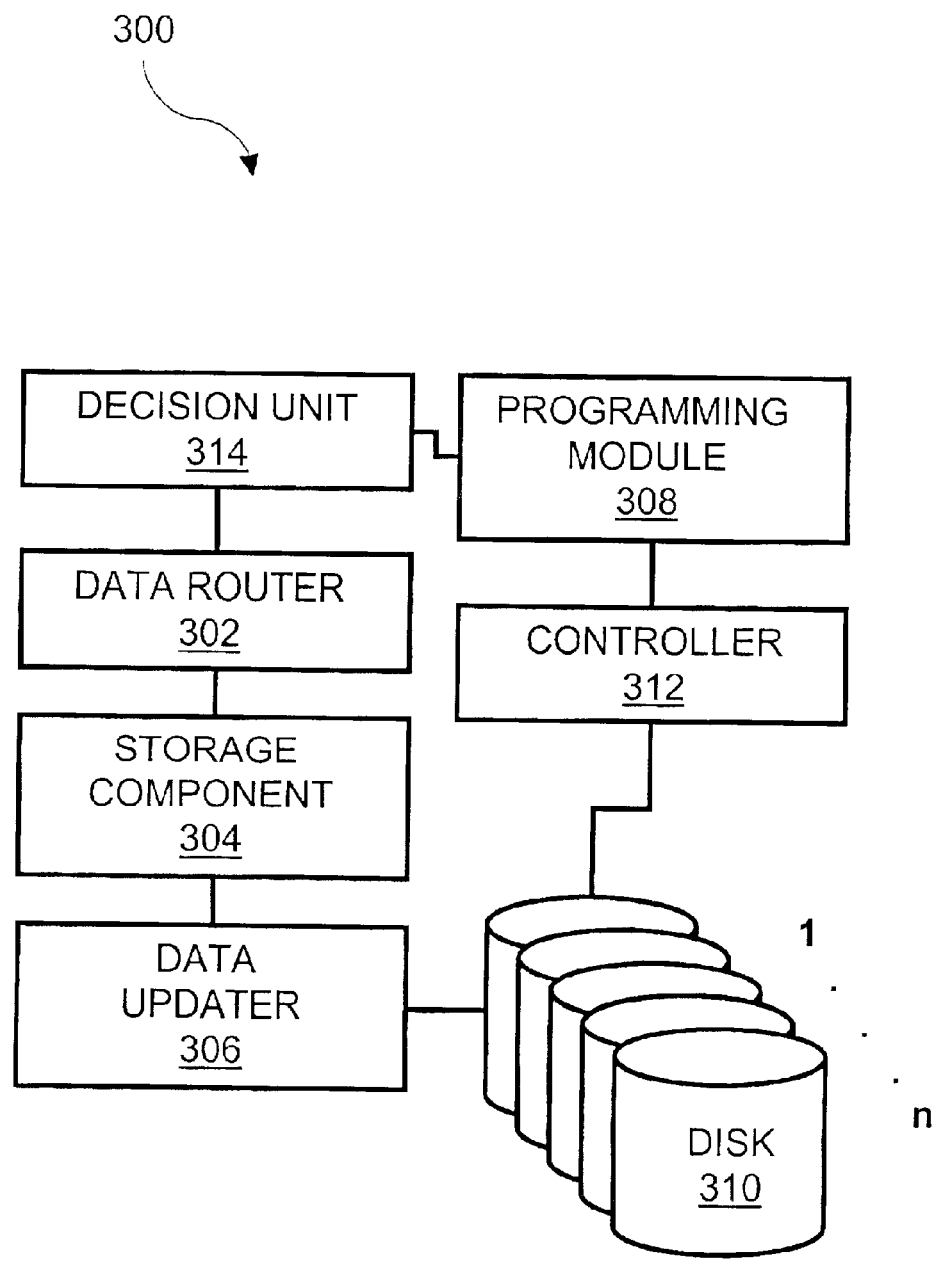
FIG. 3 is a block diagram illustrating another exemplary preferred embodiment operation of the invention.

FIG. 3 illustrates an exemplary preferred embodiment of the invention as system 300. System 300 is configured to program firmware instructions into disk-drive controller 312 of a disk. The disk may be one of the plurality of disks 310. An example of the plurality of disks 310 may include a Redundant Array of Independent Disks (RAID) storage system. Each disk of the plurality of disks 310 may include a disk-drive controller, such as disk-drive controller 312. Disk drive controller 312 may be configured to enable and disable the disk for installing firmware instructions in disk-drive controller 312. System 300 includes decision unit 314, data router 302, storage component 304, data updater 306, and programming module 308.

Programming module 308 is communicatively connected to disk-drive controller 312 to modify firmware of disk-drive controller 312. A modification to the firmware may include either an upgrade or a downgrade to current firmware residing in disk-drive controller 312. A firmware upgrade may include a new set of firmware instructions used to direct disk-drive controller 312. A firmware downgrade may include a previous set of firmware instructions, which may be used in the event of faults, or "bugs", found in a present set of firmware instructions. An example of disk-drive controller could include a microprocessor.

Decision unit 314 is communicatively connected to programming module 308 and to data router 302. Decision unit 314 may be configured to determine if a disk is one of the plurality of disks 310. If the disk is not one of the plurality of disks 310, a decision is made that allows programming module 308 to modify the firmware of disk-drive controller 312. An example of a disk not being one of the plurality of disks 310 would include a spare disk to be used when a disk needs replacement. If the disk is one of the plurality of disks 310, decision unit 314 directs data router 302 to redirect update requests.

Data router 302 is communicatively connected to storage component 304. Data router 302 may be configured to route update requests of a disk of the plurality of disks 310. Data router 302 may be configured to route update requests of the disk to storage component 304. Storage component 304 is communicatively connected to data router 302 and to data updater 306. Storage component 304 may be configured to receive the update requests of the disk from data router 302 and store the requests in a unit log.

Data updater 306 is communicatively connected to the disk of the plurality of disks 310 and to storage component 304. Data updater 306 may be configured to update data within a portion of the disk of the plurality of disks 310 based on logged update requests stored in the unit log. In the preferred embodiment, data updater 306 reconstructs data located on portions of the disk based on the logged update requests. The portions of the disk may typically include sectors and/or disk partitions. In another embodiment of the invention, the logged update requests include write requests such that data updater 306 updates data on the disk based on the write requests logged in the unit log of storage component 304.

Figure 4:
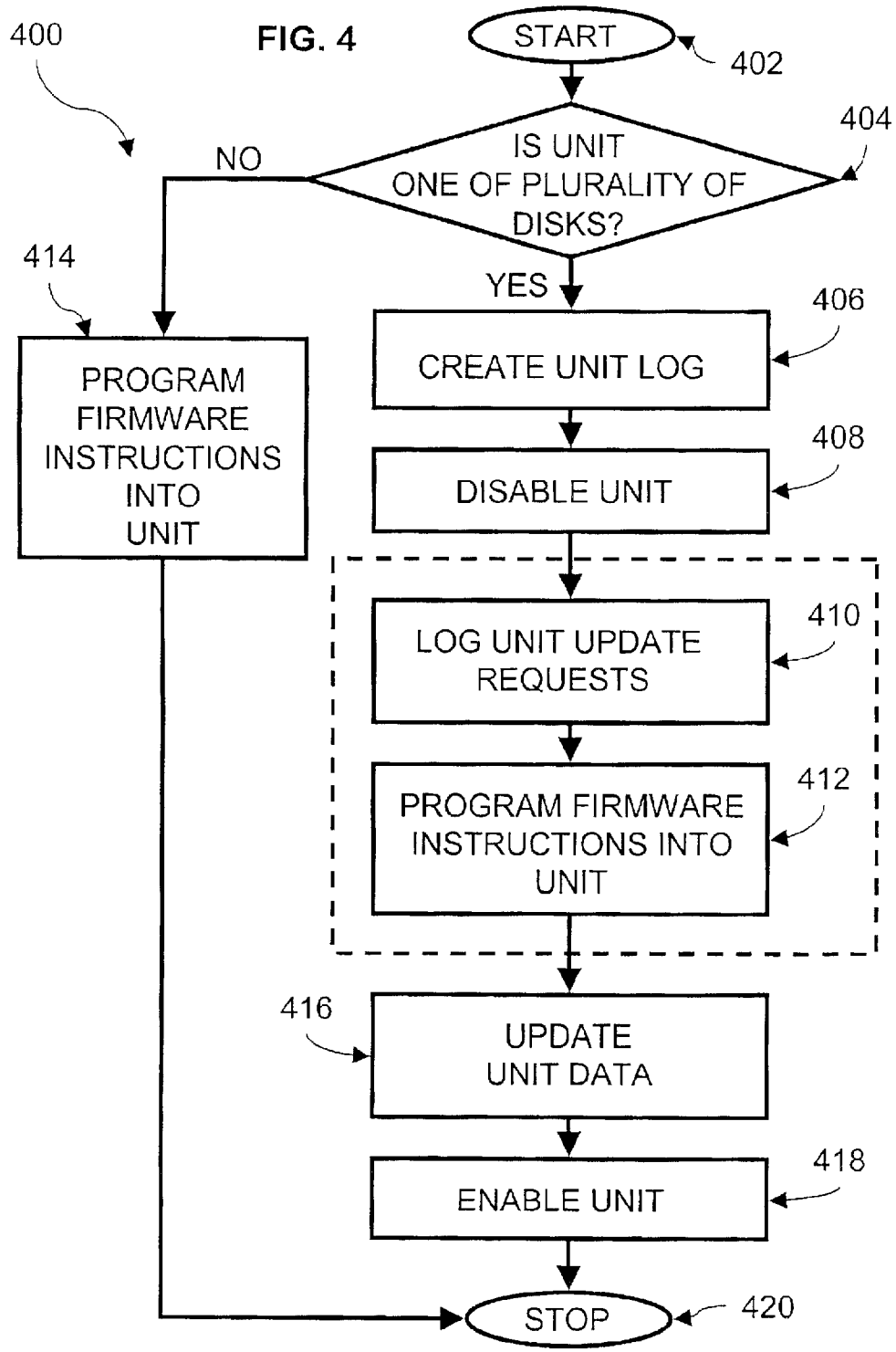
FIG. 4 is a flow chart diagram illustrating another exemplary preferred operation of the invention.

FIG. 4 illustrates exemplary preferred operation 400 of system 300 of FIG. 3. Operation 400 commences in step 402. A decision is made to determine if a disk is one of the plurality of disks 310 of FIG. 3 in decision block 404. If the disk is not one of the plurality of disks 310, such as a spare disk, programming module 308 programs firmware instructions into disk-drive controller 312 in step 414. Operation 400 ends in step 420 upon completion of step 414. However, if the disk is one of the plurality of disks 310, operation 400 creates a unit log in step 406. The unit log is stored in storage component 304 of FIG. 3.

Disk driver controller 312 disables the disk of the plurality of disks 310 such that the disk no longer receives update requests in step 408. Once the disk is disabled, update requests directed to the disk are routed to the unit log by data router 302 of FIG. 3 in step 410. The update requests are logged in the unit log. Firmware instructions are modified in disk-drive controller 312 by programming module 308 in step 412. Firmware modifications can include installations of firmware upgrades and/or downgrades that change the present set of firmware instructions of disk-drive controller 312. As above in FIG. 2, a dashed line around steps 410 and 412 indicates that the steps are performed substantially in parallel. In other words, information reflective of updates to the disabled unit is logged (step 410) while the firmware of the unit is being updated (step 412). Once firmware modifications are complete, data can be reconstructed on the disk by data updater 306 based on logged update requests of the unit log in step 416.

Data updater 306 can reconstruct data located on portions of the disk based on the logged update requests. Optionally, data updater 306 can update data of files on the disk based on write requests. Once the data on the disk is updated, disk-drive controller 312 enables the disk in step 418. Once the disk is enabled, update requests are redirected to the disk and the logging of update requests for the disk discontinues. Operation 400 ends in step 420. Those skilled in the art will understand that other methods can be used to program firmware instructions into disk-drive controller 312 of a disk within the plurality of disks 310 such that data on the disk is not totally reconstructed.

Instructions that perform the above operation can be stored on storage media. The instructions can be retrieved and executed by a microprocessor. Some examples of instructions are software, program code, and firmware. Some examples of storage media are memory devices, tapes, disks, integrated circuits, and servers. The instructions are operational when executed by the microprocessor to direct the microprocessor to operate in accord with the invention. Those skilled in the art are familiar with instructions and storage media.

Advantages of the above embodiments of the invention include decreasing an amount of time required to reconstruct data on a disk in a Redundant Array of Independent Disks (RAID) storage system due to software installations to the disk. Other advantages include removing a need for data reconstruction by logging updates, or write requests, to data on the disk such that the data is updated with respect to the write requests.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of upgrading firmware in a unit of a redundancy group in a Redundant Array of Independent Disks, the method including steps of:
   disabling the unit;
   modifying the firmware of a controller of the disabled unit in response to disabling the unit;
   logging update requests directed to the disabled unit in a unit log during the step of modifying; and
   updating data within a portion of the disabled unit based on the logged update requests of the unit log in response to a completion of the step of modifying, wherein the disabled unit includes a number of disks that is less than all of the redundancy group and wherein the redundancy group remains available for processing I/O operations during operation of the method.

2. The method of claim 1, wherein the step of modifying includes a step of programming firmware instructions in the controller of the disabled unit.

3. The method of claim 1 further includes a step of enabling the disabled unit in response to a completion of the step of updating.

4. The method of claim 1, wherein the step of logging update requests includes a step of logging write requests to the unit log for updating information stored on the disabled unit wherein the logged write requests include data to be written to the disabled unit.

5. The method of claim 4 wherein the step of updating includes a step of processing the logged write requests for updating information stored on the disabled unit.

6. The method of claim 1 wherein the step of logging includes a step of logging logical block numbers for blocks on the disabled unit affected by the update requests processed during the step of modifying.

7. The method of claim 6, wherein the step of updating includes a step of reconstructing the data within the portion of the disabled unit in response to the completion of the step of modifying based on logged update requests.

8. A system for programming firmware instructions into a disk-drive controller of a first disk within a plurality of disks in a RAID storage subsystem, the system including:
   a data router for routing update requests of the first disk;
   a storage component communicatively connected to the data router for logging the update requests in a unit log;
   a data updater communicatively connected to the storage component for updating data within a portion of the first disk based on the logged update requests of the unit log; and
   a programming module communicatively connected to the disk-drive controller of the first disk for modifying the firmware instructions while remaining disks of the plurality of disks continue to operate to process I/O requests directed to the RAID storage subsystem.

9. The system of claim 8, wherein the disk-drive controller is communicatively connected to the data router for enabling and disabling update requests to the first disk.

10. The system of claim 8, wherein the data updater updates the data within the first disk upon modifying the firmware instructions based on write requests to the unit log of the storage component.

11. The system of claim 8, wherein the data updater reconstructs the data within the unit in response to a completion of the step of modifying based on the logged update requests.

12. The system of claim 8, wherein the storage component is communicatively connected to the data router for logging logical block numbers for blocks on the first disk affected by the update requests processed during modification of the firmware.

13. The system of claim 8, wherein the data updater is communicatively connected to the storage component for reconstructing the data within the portion of the first disk in response to a completion of the step of modifying based on logged update requests.

14. A system for upgrading firmware in a unit of a redundancy group in a Redundant Array of Independent Disks, including:
   means for disabling the unit;
   means for modifying the firmware of a controller of the disabled unit in response to disabling the unit;
   means for logging update requests directed to the disabled unit in a unit log during modification; and
   means for updating data within a portion of the disabled unit based on the logged update requests of the unit log in response to a completion of the modification, wherein the disabled unit includes a number of disks that is less than all of the redundancy group and wherein the redundancy group remains available for processing I/O operations during operation of the method.

15. The system of claim 14, wherein the means for modifying includes a means for programming firmware instructions in the controller of the disabled unit.

16. The system of claim 14 further includes a means for enabling the disabled unit in response to a completion of updating.

17. The system of claim 14, wherein the means for logging includes a means for logging write requests to the unit log for updating information stored on the disabled unit wherein the logged write requests include data to be written to the disabled unit.

18. The system of claim 17, wherein the means for updating includes a means for processing the logged write requests for updating information stored on the disabled unit.

19. The system of claim 14 wherein the means for logging includes a means for logging logical block numbers for blocks on the disabled unit affected by the update requests processed during the modification.

20. The system of claim 19, wherein the means for updating includes a means for reconstructing the data within the portion of the disabled unit in response to completion of modifying based on logged update requests.

* * * * *